US012741625B2

(12) United States Patent
Choi

(10) Patent No.: US 12,741,625 B2
(45) Date of Patent: Sep. 22, 2026

(54) TRAVEL CONTROL METHOD AND APPARATUS

(71) Applicant: DOOSAN BOBCAT KOREA CO., LTD., Incheon (KR)

(72) Inventor: Nakhun Choi, Bucheon-si (KR)

(73) Assignee: DOOSAN BOBCAT KOREA CO., LTD., Incheon (KR)

( * ) Notice: Subject to any disclaimer, the term of this patent is extended or adjusted under 35 U.S.C. 154(b) by 61 days.

(21) Appl. No.: 18/893,886

(22) Filed: Sep. 23, 2024

(65) Prior Publication Data

US 2025/0269832 A1 Aug. 28, 2025

(30) Foreign Application Priority Data

Feb. 22, 2024 (KR) ........................ 10-2024-0025514

(51) Int. Cl.
*B60W 10/04* (2006.01)

(52) U.S. Cl.
CPC ......... *B60W 10/04* (2013.01); *B60W 2300/12* (2013.01); *B60W 2520/10* (2013.01); *B60W 2552/15* (2020.02)

(58) Field of Classification Search
CPC ............. B60W 10/04; B60W 2300/12; B60W 2520/10; B60W 2552/15; B60W 30/18009; B60W 30/18172; B60W 30/18; B60W 40/076; B60W 2520/28; B60W 2540/10; B60L 2200/42; B60L 15/2081; B60F 17/003; B66F 9/07572; B66F 9/075; B66F 9/0759; B60Y 2200/15
USPC ........................................................... 701/70
See application file for complete search history.

(56) References Cited

U.S. PATENT DOCUMENTS

2020/0216141 A1* 7/2020 Murthy .................... B62M 6/50
2025/0128713 A1* 4/2025 Zhou .................. B60W 30/182

FOREIGN PATENT DOCUMENTS

| | | |
|---|---|---|
| EP | 2433831 B1 | 6/2022 |
| KR | 10-2004-0056845 A | 7/2004 |
| KR | 10-2017-0091937 A | 8/2017 |
| KR | 10-2281876 B1 | 7/2021 |

OTHER PUBLICATIONS

Extended search report from European Patent Application No. 24202828.0 dated Mar. 11, 2025.
Office action from South Korean Patent Application No. 10-2024-0025514 dated Jan. 12, 2026.

* cited by examiner

*Primary Examiner* — Yi-Kai Wang
(74) *Attorney, Agent, or Firm* — Ladas & Parry, LLP

(57) ABSTRACT

Disclosed is a travel control method and apparatus. A travel control method and apparatus according to the present embodiment includes detecting a travel speed of an industrial vehicle, detecting a gradient of a road surface, setting an accel drive function of the industrial vehicle to be turned on or off, and controlling driving of a travel apparatus on the basis of a state in which the accel drive function is turned on or off.

10 Claims, 3 Drawing Sheets

FIG. 1

TRAVEL CONTROL METHOD AND APPARATUS

CROSS-REFERENCE TO RELATED APPLICATION

This application claims the benefit of and priority to Korean Patent Application No. 10-2024-0025514, filed on Feb. 22, 2024 in the Korean Intellectual Property Office, the disclosure of which is incorporated herein by reference in its entirety.

BACKGROUND

1. Field

Embodiments of the present disclosure relate to a travel control method and apparatus, and more specifically, to a travel control method and apparatus capable of preventing an industrial vehicle from being pushed down on an inclined road.

2. Description of the Related Art

Industrial vehicles can be used for unloading, transporting, and loading cargo. Such industrial vehicles may be forklifts, and the forklifts may be divided into engine forklifts and electric forklifts according to power sources.

A forklift moves a cargo object by loading the cargo object, moving, and unloading the cargo object. The forklift receives power from a power source to operate a hydraulic system, and the hydraulic system generates a hydraulic pressure for traveling or vertically moving forks. The forks of the forklift may be provided on a mast, and the mast may be tilted forward or backward on the forklift. The forklift moves in a state in which the mast is tilted backward to prevent the cargo object from falling off during travel. In this case, "backward tilt" means that the mast is tilted toward a main body of the forklift. Conversely, "forward tilt" means that the mast is tilted in a forward direction opposite to a direction toward the main body of the forklift.

An industrial vehicle may require an accel drive function during flat road travel at speeds greater than about 2.4 km/h. However, when the accel drive function is applied on an inclined road, a phenomenon in which the industrial vehicle is pushed down for a delay time for which an acceleration pedal is pressed may occur, and thus an accident may occur. Accordingly, research on preventing industrial vehicles from being pushed down on an inclined road is required.

RELATED ART

Patent Document

Korean Laid-open Patent Publication No. 10-2004-0056845 (Jul. 1, 2004)

SUMMARY

Therefore, it is one aspect of the present disclosure to provide a travel control method and apparatus which turns an accel drive function on or off on the basis of a gradient of a road surface to prevent an industrial vehicle from being pushed down on an inclined road.

In accordance with one aspect of the present disclosure, a travel control method includes detecting a travel speed of an industrial vehicle, detecting a gradient of a road surface, setting an accel drive function of the industrial vehicle to be turned on or off, and controlling driving of a travel apparatus on the basis of a state in which the accel drive function is turned on or off.

The setting of the accel drive function to be turned on or off may include setting the accel drive function to be turned off in a case in which the gradient is greater than or equal to a reference gradient in a state in which the industrial vehicle is stopped.

The setting of the accel drive function to be turned on or off may include setting the accel drive function to be turned on in a case in which the gradient is smaller than a reference gradient in a state in which the industrial vehicle is stopped.

The controlling of the driving of the travel apparatus may include controlling the driving of the travel apparatus on the basis of an output according to a manipulation state of a direction lever in the state in which the accel drive function is turned off.

The controlling of the driving of the travel apparatus may include controlling the driving of the travel apparatus on the basis of an output according to a manipulation state of a direction lever and an output of an accel pedal (14) in the state in which the accel drive function is turned on.

In accordance with another aspect of the present disclosure, a travel control apparatus for controlling a travel apparatus of an industrial vehicle includes a travel speed detector configured to detect a travel speed on the basis of an output of a wheel speed sensor of the industrial vehicle, a gradient detector configured to detect a gradient of a road surface on the basis of an output of an acceleration sensor of the industrial vehicle, and a travel controller configured to set an accel drive function of the industrial vehicle to be turned on or off on the basis of the travel speed and the gradient and control driving of the travel apparatus on the basis of a state in which the accel drive function is turned on or off.

The travel controller may set the accel drive function to be turned off in a case in which the gradient is greater than or equal to a reference gradient in a state in which the industrial vehicle is stopped.

The travel controller may set the accel drive function to be turned on in a case in which the gradient is smaller than a reference gradient in a state in which the industrial vehicle is stopped.

The travel controller may control the driving of the travel apparatus on the basis of an output according to a manipulation state of the direction lever of the industrial vehicle in a state in which the accel drive function is turned off.

The travel controller may control the driving of the travel apparatus on the basis of an output according to a manipulation state of the direction lever and an output of an accel pedal of the industrial vehicle in a state in which the accel drive function is turned on.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a schematic view illustrating a configuration of an industrial vehicle according to one embodiment of the present invention of the present disclosure;

DETAILED DESCRIPTION

Figure 2:
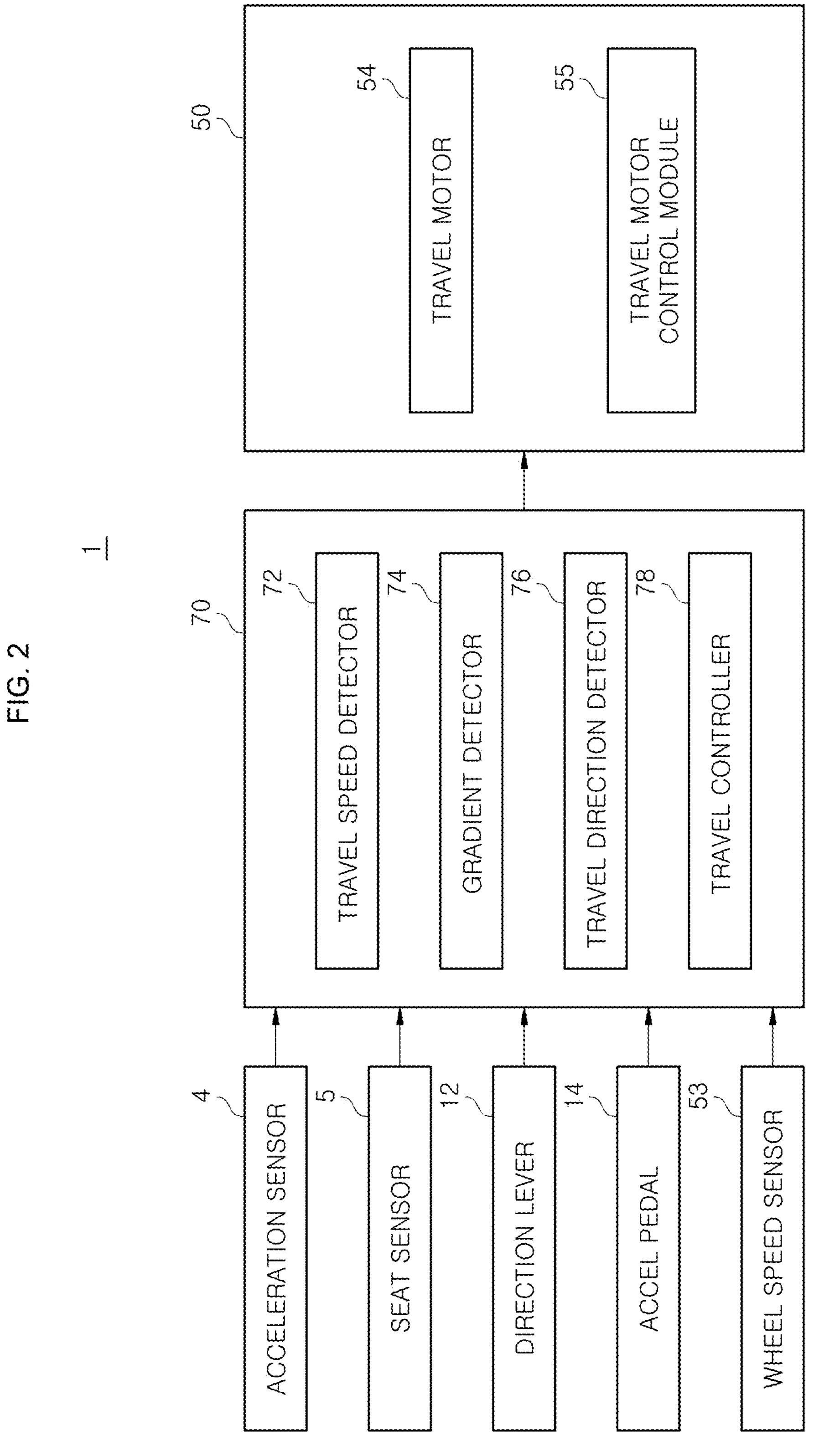
FIG. 2 is a view illustrating a detailed configuration of the travel control apparatus according to one embodiment of the present invention of the present disclosure.

Like reference numerals denote like elements throughout the specification. In the present specification, not all elements of embodiments are described, and general content in the art or repeated content between the embodiments will not be described. Components described as "parts," "modules," "members," and "blocks" in the specification can be implemented using software or hardware, and a plurality of parts, modules, members, and blocks may be implemented as a single element, or one part, module, member, or block may also include a plurality of elements.

Throughout the specification, when a first portion is referred to as being "connected" to a second portion, it includes "directly connected" to the second portion and "indirectly connected" to the second portion, and "indirectly connected" to the second portion includes "connected" to the second portion through a wireless communication network.

Throughout this specification, when a certain part "includes" a certain component, other components are not excluded from being included unless explicitly described otherwise, and other components may further be included therein.

Throughout this specification, when a certain member is referred to as being "on" another member, the certain member is in contact with another member or yet another member is interposed between the two members.

Terms such as "first," "second," and the like are used herein to distinguish one component from another component, and the components are not limited by the above-described terms.

Singular forms "a" and "an" include the plural forms as well, unless the context clearly indicates otherwise.

Reference numerals in operations are used for the sake of convenience in description and do not describe an order of the operations, and the operations may be performed through an order different from the described order unless the context clearly indicates a specific order.

Hereinafter, an operation principle and embodiments of the disclosure will be described with reference to the accompanying drawings.

Figure 1:
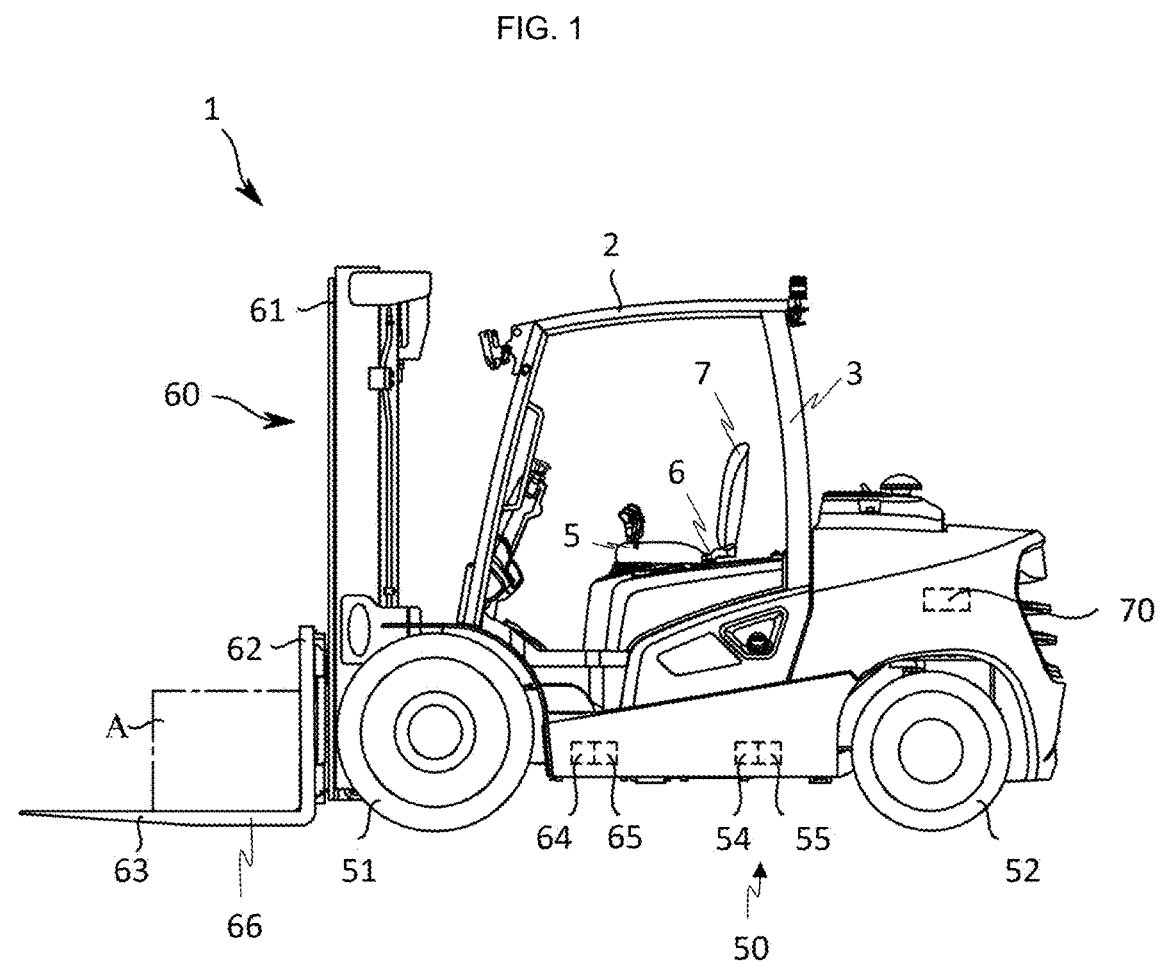

FIG. 1 is a schematic view illustrating a configuration of an industrial vehicle according to one embodiment of the present invention of the present disclosure. FIG. 2 is a view illustrating a detailed configuration of the travel control apparatus according to one embodiment of the present invention of the present disclosure.

Referring to FIGS. 1 and 2, in one embodiment of the present disclosure, an industrial vehicle 1 may include a forklift which moves a cargo object.

An accel drive function may be embedded in the industrial vehicle 1 according to one embodiment of the present invention of the present disclosure and may turn the accel drive function off to prevent a risk of occurrence of a pushed phenomenon after checking a state of the industrial vehicle 1 when the industrial vehicle 1 in a stopped state starts to move on an inclined road. For example, the industrial vehicle 1 may travel on the basis of an output of a direction lever 12 or the accel drive function according to a type and safety setting.

In this case, travel under the accel drive function may be set to start on the basis of an output of the direction lever 12 and an output of an accel pedal 14 of the industrial vehicle 1. That is, under the accel drive function, the industrial vehicle 1 may travel only when a travel control apparatus 70 receives both the output of the direction lever 12 and the output of the accel pedal 14 for the sake of safety. However, an initial start condition in the accel drive function may be limited to a case in which the industrial vehicle 1 starts after being stopped for about 2 seconds.

In this case, the direction lever 12 may output a direction signal according to forward or backward movement manipulation in order to command a forward or backward travel direction of the industrial vehicle 1 according to an intention of a driver. In addition, the accel pedal 14 may output an acceleration signal for commanding acceleration of the industrial vehicle 1 according to the intention of the driver.

The industrial vehicle 1 may include a vehicle body 2, a travel apparatus 50, a working apparatus 60, and the travel control apparatus 70.

Specifically, the vehicle body 2 may be provided with a driving room 3 for the driver to occupy and an acceleration sensor 4 which outputs a signal value on the basis of a gradient of a road surface.

The driving room 3 may be provided with a seat 7 including a seat sensor 5 which detects seating of the driver and a seat belt 6 fastened for safety of the driver.

The travel apparatus 50 may include a front wheel 51, a rear wheel 52, a wheel speed sensor 53, a travel motor 54, and a travel motor control module 55.

The wheel speed sensor 53 may detect a rotation speed of at least one of the front wheel 51 and the rear wheel 52.

The travel motor 54 and the travel motor control module 55 may be provided between the front wheel 51 and the rear wheel 52 in an inner portion under the driving room 3.

The travel motor 54 may rotate at least one of the front wheel 51 and the rear wheel 52 on the basis of an operation in a set rotational direction. The travel motor 54 may include a transmission as necessary.

The travel motor control module 55 may drive the travel motor 54 in a first rotational direction or second rotational direction.

When the travel motor control module 55 drives the travel motor 54 in the first rotational direction, the industrial vehicle 1 may be moved forward by an operation in the first rotational direction of the front wheel 51 and the rear wheel 52. In addition, when the travel motor control module 55 drives the travel motor 54 in the second rotational direction, the industrial vehicle 1 may be moved backward by an operation in the second rotational direction of the front wheel 51 and the rear wheel 52.

The travel motor control module 55 may generate a motor current for driving the travel motor 54 in the first rotational direction or second rotational direction and apply the motor current to the travel motor 54. For example, the travel motor control module 55 may include an H-bridge circuit formed of a plurality of power switching elements to drive the travel motor 54 in the first rotational direction or second rotational direction.

The working apparatus 60 may be provided in front of the vehicle body 2 and may perform an operation of, for example, unloading, transporting, or loading a cargo object A according to a manipulation of the driver. The working apparatus 60 may include a mast assembly including a carriage 62 capable of rising upward or lowering downward along a mast rail 61 and a pair of forks 63 connected to the carriage 62. The pair of forks 63 may be provided such that a distance therebetween is adjustable and may perform an operation such as unloading, transporting, or loading the cargo object A by lifting the cargo object A.

The working apparatus 60 may include a working motor 64, a working motor control module 65, and a weight measurement sensor 66.

The working motor 64 and the working motor control module 65 may be provided between the front wheel 51 and the rear wheel 52 to be spaced apart from the travel motor 54 and the travel motor control module 55.

The working motor control module 65 may drive the working motor 64 in the first rotational direction or second rotational direction. When the working motor control module 65 drives the working motor 64 in the first rotational direction, the forks 63 may be moved upward by an upward operation of the carriage 62. In addition, when the working motor control module 65 drives the working motor 64 in the second rotational direction, the forks 63 may be moved downward by a downward operation of the carriage 62.

The working motor control module 65 may generate a motor current for driving the working motor 64 in the first rotational direction or second rotational direction and apply the motor current to the working motor 64. For example, the working motor control module 65 may include an H-bridge circuit formed of a plurality of power switching elements to drive the working motor 64 in the first rotational direction or second rotational direction.

The weight measurement sensor 66 may measure a weight applied to the forks 63 and output a weight signal value on the basis of the measured weight.

The travel control apparatus 70 may determine a travel state of the industrial vehicle 1 and control the travel apparatus 50 on the basis of a determination result. The travel control apparatus 70 may include a travel speed detector 72, a gradient detector 74, a travel direction detector 76, and a travel controller 78.

The travel speed detector 72 may detect a travel speed of the industrial vehicle 1 on the basis of an output of the wheel speed sensor 53 and provide the detected travel speed to the travel controller 78. For example, the travel speed detector 72 may receive an output of the wheel speed sensor 53 installed on each wheel of the industrial vehicle 1 through a vehicle network and output a travel speed signal value set on the basis of the output of the wheel speed sensor 53.

The gradient detector 74 may detect a gradient of the road surface on the basis of an output of the acceleration sensor 4 and provide the detected gradient to the travel controller 78. For example, the gradient detector 74 may receive an output of the longitudinal acceleration sensor 4 installed in the industrial vehicle 1 through the vehicle network, detect a gradient of a road surface on the basis of the output of the longitudinal acceleration sensor 4, and output a gradient signal value set on the basis of the detected gradient.

The travel direction detector 76 may detect a travel direction of the industrial vehicle 1 on the basis of an output (direction signal) of the direction lever 12 and provide the detected travel direction to the travel controller 78.

The travel controller 78 may set the accel drive function to be turned on or off on the basis of a seating state of the driver, a travel speed of the industrial vehicle 1, a gradient of a road surface, and a direction signal. In addition, the travel controller 78 may prevent the industrial vehicle 1 from being pushed down on an inclined road by controlling the travel apparatus 50 on the basis of the turning on or off of the accel drive function.

Specifically, the travel controller 78 may detect a seating state of the driver on the basis of an output of the seat sensor 5.

The travel controller 78 may determine whether the industrial vehicle 1 is in a stopped state or traveling state on the basis of a travel speed of the industrial vehicle 1.

The travel controller 78 may set the accel drive function to be turned off when a gradient of a road surface is greater than or equal to a reference gradient in the stopped state of the industrial vehicle 1. When the industrial vehicle 1 starts to move on an inclined road in a state in which the accel drive function is turned on, since the travel controller 78 should additionally receive an acceleration signal compared to a case in which the industrial vehicle 1 travels on the basis of a direction signal, a delay may occur when the industrial vehicle 1 starts. Accordingly, in the industrial vehicle 1 in which the accel drive function is embedded, the industrial vehicle 1 may be frequently pushed down on the inclined road. Accordingly, when the industrial vehicle 1 starts to move on a road surface of which a gradient is greater than the reference gradient, the travel controller 78 may turn the accel drive function off to prevent pushing down on the inclined road.

In a state in which the accel drive function is turned off, the travel controller 78 may control the driving (forward or backward movement) of the travel apparatus 50 on the basis of an output according to a forward or backward movement manipulation of the direction lever 12 to prevent pushing down on the inclined road. For example, when the travel controller 78 receives a direction signal from the direction lever 12 in a stopped state on the inclined road, the travel controller 78 may require the travel apparatus 50 to immediately move forward or backward to prevent pushing down on the inclined road.

In this case, the reference gradient may be set as a gradient at which at least one of the backboard performance and the steering stability of the industrial vehicle 1 is degraded. In addition, the reference gradient may be set to vary on the basis of an output of the weight measurement sensor 66. When an overweight of one ton is applied to the forks 63, since a center of gravity of the industrial vehicle 1 moves toward the forks 63 as the gradient increases, the balance and/or stability of the industrial vehicle 1 may be degraded, and pushing down on the inclined road may be severe. Accordingly, the travel controller 78 may set the reference gradient to be low as a weight applied to the forks 63 increases to be greater than a reference value and set the reference gradient to be high when a weight applied to the forks 63 is smaller than the reference value.

In a state in which the industrial vehicle 1 is stopped, when a gradient of the road surface is smaller than the reference gradient, the travel controller 78 may set the accel drive function to be turned on. In a state in which the accel drive function is turned on, the travel controller 78 may control the driving (forward or backward movement) of the travel apparatus 50 on the basis of an output of the direction lever 12 and an output of the accel pedal 14. For example, when the travel controller 78 receives a direction signal from the direction lever 12 and an acceleration signal from the accel pedal 14, the travel controller 78 may control the driving (forward or backward movement) of the travel apparatus 50.

However, when a gradient for setting the accel drive function to be turned on or off is the same, the accel drive function may be frequently turned on or off due to fine errors of the acceleration sensor 4, and the travel and stop of the industrial vehicle 1 may be repeated. Accordingly, the travel controller 78 may turn the accel drive function on when a gradient of a road surface is smaller than the reference gradient by an angle of about 0.5 degrees.

Hereinafter, a travel control method according to another embodiment of the present disclosure will be described with reference to FIG. 3.

Figure 3:
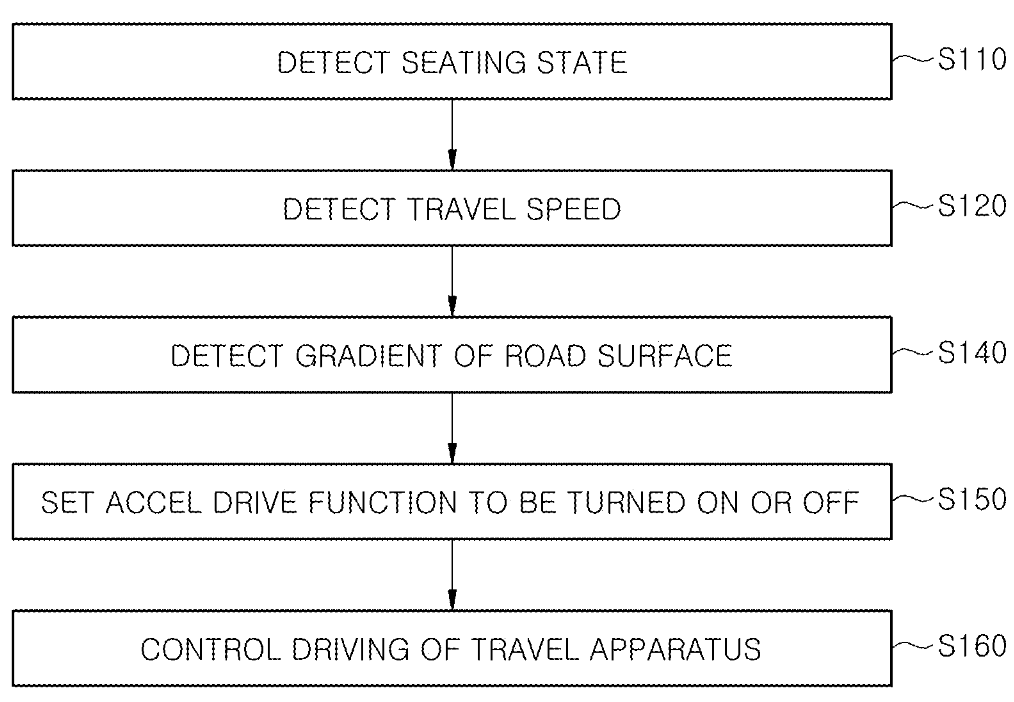
FIG. 3 is a flowchart illustrating a method of controlling a travel control apparatus according to another embodiment of the present disclosure.

FIG. 3 is a flowchart illustrating a method of controlling a travel control apparatus according to another embodiment of the present disclosure.

The method of controlling a travel control apparatus according to another embodiment of the present disclosure will be described based on the operation of the travel control apparatus according to one embodiment of the present invention.

Referring to FIG. 3, the method of controlling a travel control apparatus according to another embodiment of the present disclosure may include detecting a seating state of a driver (S110), detecting a travel speed of an industrial vehicle (S120), detecting a gradient of a road surface (S140), setting an accel drive function to be turned on or off (S150), and controlling driving of a travel apparatus on the basis of a state in which the accel drive function is turned on or off (S160).

In operation S110, the seating state of the driver may be detected on the basis of an output of a seat sensor and an output of a seat belt. In this case, a travel controller may check the seating state of the driver so that industrial vehicle 1 travels in a state in which the driver is sitting on the seat and has fastened the seat belt for the safety of the driver.

In operation S120, a travel speed detector may detect the travel speed of the industrial vehicle on the basis of an output of a wheel speed sensor and provide the detected travel speed to the travel controller. The travel speed detector may detect a rotation speed of a wheel using the wheel speed sensor installed in the industrial vehicle and output a travel speed signal value set on the basis of the detected rotation speed. The travel controller may determine whether the industrial vehicle is in a stopped state or traveling state on the basis of the travel speed.

In operation S140, the gradient detector detects the gradient of the road surface and provides the detected gradient to the travel controller. In this case, the gradient detector may detect the gradient of the road surface using a longitudinal acceleration sensor installed in the vehicle and output a gradient signal value set on the basis of the detected gradient.

In operation S150, the travel controller may set the accel drive function to be turned on or off on the basis of the gradient of the road surface. In this case, in a state in which the industrial vehicle is stopped, the travel controller may set the accel drive function to be turned off when the gradient of the road surface is greater than or equal to a reference gradient. In addition, in the state in which the industrial vehicle is stopped, the travel controller may set the accel drive function to be turned on when the gradient of the road surface is smaller than the reference gradient.

In operation S160, the travel controller may control the driving of the travel apparatus on the basis of the state in which the accel drive function is turned on or off. In the state in which the accel drive function is turned off, the travel controller may control the driving (forward or backward movement) of the travel apparatus on the basis of an output according to a forward or backward manipulation of a direction lever in order to prevent pushing down on an inclined road. In addition, in the state in which the accel drive function is turned on, the travel controller may control the driving (forward or backward movement) of the travel apparatus on the basis of an output of the direction lever and an output of an accel pedal.

A travel control apparatus and a method of controlling the same according to an embodiment of the present disclosure can prevent an industrial vehicle from being pushed down on an inclined road by turning an accel drive function on or off on the basis of a travel speed, a gradient of a road surface, and a forward or backward movement manipulation of the industrial vehicle.

According to one aspect of the present disclosure, a travel control method and apparatus which can turn an accel drive function on or off on the basis of a gradient of a road surface to prevent an industrial vehicle from being pushed down on an inclined road can be provided.

The above-described present specification may be implemented as computer readable codes in a medium in which programs are stored. The computer readable medium includes any data storage device in which computer readable data is stored. Examples of the computer readable recording medium may include a hard disk drive (HDD), a solid state disk (SSD), a silicon disk drive (SDD), a read-only memory (ROM), a random-access memory (RAM), a compact disc (CD)-ROM, a magnetic tape, a floppy disk, an optical data storage device, and the like, and may also include a medium implemented as a type of carrier waves (for example, transmission through the Internet). Accordingly, the above description is not to be construed as limiting in any aspect but should be considered as exemplary embodiments. The scope of the present specification should be determined by reasonable interpretation of the appended claims, and all modifications within an equivalent range of the present specification are encompassed in the scope of the present specification.

In addition, while the present disclosure has been described with reference to embodiments above, the embodiments are only exemplary and do not limit the present specification, and it will be understood by those skilled in the art that various changes and applications which are not illustrated above may be made without departing from the essential characteristics of the present embodiments. For example, components specifically described according to the embodiments may be modified. In addition, such differences relating to the modifications and applications should be understood to be included in the scope of the present specification defined by the appended claims.

What is claimed is:

1. A travel control method of comprising:

detecting a travel speed of an industrial vehicle;

detecting a gradient of a road surface;

setting an accel drive function of the industrial vehicle to be turned on or off on the basis of a seating state of a driver, the travel speed, and the gradient; and controlling driving of a travel apparatus on the basis of a state in which the accel drive function is turned on or off.

2. The method of claim 1, wherein the setting of the accel drive function to be turned on or off includes setting the accel drive function to be turned off in a case in which the gradient is greater than or equal to a reference gradient in a state in which the industrial vehicle is stopped.

3. The method of claim 1, wherein the setting of the accel drive function to be turned on or off includes setting the accel drive function to be turned on in a case in which the gradient is smaller than a reference gradient in a state in which the industrial vehicle is stopped.

4. The method of claim 1, wherein the controlling of the driving of the travel apparatus includes controlling the driving of the travel apparatus on the basis of an output according to a manipulation state of a direction lever in the state in which the accel drive function is turned off.

5. The method of claim 1, wherein the controlling of the driving of the travel apparatus includes controlling the driving of the travel apparatus on the basis of an output according to a manipulation state of a direction lever and an output of an accel pedal in the state in which the accel drive function is turned on.

6. A travel control apparatus for controlling a travel apparatus of an industrial vehicle, the travel control apparatus comprising:

a travel speed detector configured to detect a travel speed on the basis of an output of a wheel speed sensor of the industrial vehicle;

a gradient detector configured to detect a gradient of a road surface on the basis of an output of an acceleration sensor of the industrial vehicle; and a travel controller configured to set an accel drive function of the industrial vehicle to be turned on or off on the basis of a seating state of a driver, the travel speed and the gradient and control driving of the travel apparatus on the basis of a state in which the accel drive function is turned on or off.

7. The travel control apparatus of claim 6, wherein the travel controller sets the accel drive function to be turned off in a case in which the gradient is greater than or equal to a reference gradient in a state in which the industrial vehicle is stopped.

8. The travel control apparatus of claim 6, wherein the travel controller sets the accel drive function to be turned on in a case in which the gradient is smaller than a reference gradient in a state in which the industrial vehicle is stopped.

9. The travel control apparatus of claim 6, wherein the travel controller controls the driving of the travel apparatus on the basis of an output according to a manipulation state of a direction lever of the industrial vehicle in a state in which the accel drive function is turned off.

10. The travel control apparatus of claim 6, wherein the travel controller controls the driving of the travel apparatus on the basis of an output according to a manipulation state of a direction lever and an output of an accel pedal of the industrial vehicle in a state in which the accel drive function is turned on.

* * * * *